United States Patent
Reynolds

(10) Patent No.: US 7,683,116 B2
(45) Date of Patent: Mar. 23, 2010

(54) PEROXIDE DISPERSIONS

(75) Inventor: Jeffrey Reynolds, Cincinnati, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 364 days.

(21) Appl. No.: 11/779,340

(22) Filed: Jul. 18, 2007

(65) Prior Publication Data

US 2007/0265385 A1    Nov. 15, 2007

Related U.S. Application Data

(63) Continuation-in-part of application No. 11/178,652, filed on Jul. 11, 2005, now Pat. No. 7,550,532.

(51) Int. Cl.
*C08K 3/36*    (2006.01)

(52) U.S. Cl. .................. 524/280; 524/451; 524/599

(58) Field of Classification Search ............. 524/280, 524/451, 599
See application file for complete search history.

(56) References Cited

U.S. PATENT DOCUMENTS

| | | | | |
|---|---|---|---|---|
| 2,967,756 | A | * | 1/1961 | Mazzucchelli et al. ... 428/539.5 |
| 3,051,679 | A | | 8/1962 | Forsyth |
| 3,737,027 | A | * | 6/1973 | Ball .......................... 206/219 |
| 3,919,348 | A | * | 11/1975 | Foster et al. ................. 336/219 |
| 4,038,339 | A | * | 7/1977 | Foster ......................... 525/25 |
| 4,071,489 | A | | 1/1978 | Emmons et al. |
| 4,263,198 | A | | 4/1981 | Feldman et al. |
| 4,310,644 | A | | 1/1982 | Miley |
| 4,600,738 | A | | 7/1986 | Lamm et al. |
| 4,867,989 | A | | 9/1989 | Silva et al. |
| 5,880,181 | A | | 3/1999 | Torenbeek et al. |
| 5,907,018 | A | | 5/1999 | Mazurek et al. |
| 6,821,569 | B2 | | 11/2004 | Okada et al. |
| 7,378,455 | B2 | * | 5/2008 | Lu et al. ...................... 522/100 |
| 7,550,532 | B2 | | 6/2009 | Reynolds |
| 2003/0027903 | A1 | * | 2/2003 | Nwoko et al. ............... 524/104 |
| 2003/0035917 | A1 | | 2/2003 | Hyman |
| 2004/0092630 | A1 | * | 5/2004 | Nwoko et al. ............... 524/106 |
| 2007/0010608 | A1 | | 1/2007 | Reynolds |
| 2007/0010609 | A1 | | 1/2007 | Reynolds |

FOREIGN PATENT DOCUMENTS

| | | |
|---|---|---|
| GB | 729 780 A | 5/1955 |
| WO | 02/088249 A2 | 11/2002 |
| WO | WO 2007/005280 * | 1/2007 |

OTHER PUBLICATIONS

Election/Restrictions Requirement for U.S. Appl. No. 11/417,231 dated Jun. 23, 2009.
Office Action for U.S. Appl. No. 11/417,231 dated Sep. 1, 2009.
Examination Report pertaining to Australian patent application No. 2006269216 dated September 8, 2009.
Official Action pertaining to Canadian Application No. 2,614,745 dated August 5, 2009.
International Search Report pertaining to International application No. PCT/US2006/026650 dated Jan. 19, 2007.
International Preliminary Report on Patentability pertaining to International application No. PCT/US2006/026650 dated Jan. 16, 2008.
International Search Report pertaining to International application No. PCT/US2007/008179 dated Sep. 24, 2007.
International Preliminary Report on Patentability pertaining to International application No. PCT/US2007/008179 dated Nov. 4, 2008.

* cited by examiner

*Primary Examiner*—Bernard Lipman
(74) *Attorney, Agent, or Firm*—Dinsmore & Shohl LLP

(57) ABSTRACT

A hardener composition useful in a two part resin system. The hardener composition includes a reactive carrier, and a peroxide catalyst. The hardener composition can have a shelf life of over six months. A two-part polyester resin system and a method of making a polyester resin composition are also disclosed.

22 Claims, No Drawings

PEROXIDE DISPERSIONS

This application is a continuation-in-part of U.S. application Ser. No. 11/178,652, filed Jul. 11, 2005 now U.S. Pat. No. 7,550,532, entitled Polyester Resin Composition, which is incorporated herein by reference.

FIELD OF THE INVENTION

The present invention relates to epoxy resins for use in peroxide dispersions and their use in unsaturated polyester resins, primers, body fillers, adhesives, and putties that are used in surface repairs and surface finishing for metal and plastic substrates for equipment and vehicles such as automotive, marine, agricultural and airborne vehicles, and industrial equipment.

BACKGROUND OF THE INVENTION

Traditionally, the polyester repair markets have utilized well-defined processes in the area of damage repair. Unsaturated polyester resins, primers, fillers, adhesives, or putties are used to resurface and reshape damaged areas. For ease of understanding, the term "resin" will be used in the following description; however, it is to be understood that the term includes cured resins and prepolymers (uncured resins), primers, fillers, adhesives, and putties. The method for catalyzation and application of the resin is as much an art as it is a science. This is due in part to the very small amount of peroxide hardener (catalyst) that is used to cure the much larger amounts of unsaturated polyester resin properly. The optimum peroxide level needed to cure the resin is generally about 1 to 3 parts per hundred of the resin by weight. The resin and peroxide are packaged in separate containers, typically a large can for the filler (8 oz. to 55 gal.), and a small tube for the peroxide catalyst (0.25 oz. to 4 oz.).

The user dispenses a variable amount of resin into a cup or onto a mixing board, and adds the peroxide catalyst, essentially guessing at the correct amount for proper catalyzation. The consequences of improper catalyzation of the resin include loss of adhesion to the substrate, uncured surface (tacky), cracking of the resin due to excessive heat generation, migration of uncured resin organics to subsequent coatings resulting in discoloration of top coats, outgassing of uncured material in the presence of ultraviolet or heat energy from sunlight or paint baking systems resulting in blistering and other damage to the topcoat, as well as other problems that may require removal and replacement of the repair.

It has been difficult to create of a peroxide catalyst with a more reasonable mix ratio to the unsaturated polyester resins. The standard benzoyl and ketone peroxides use plasticizers such as phthalates as carriers. Phthalates are non-reactive and represent up to about 50% of the peroxide catalysts in commercial se. The non-reactive nature of the carrier does not adversely affect performance of the cure at levels of 1.5 to 3 parts per hundred unsaturated resin, but levels above 5 parts per hundred can disrupt the cure.

There remains a need in the art for a polyester resin composition that provides a more equal mix ratio between the resin and catalyst components.

SUMMARY OF THE INVENTION

The present invention meets this need by providing a hardener composition useful in a two-part resin system. The hardener composition includes a reactive carrier comprising an epoxy resin, and a peroxide catalyst.

Another aspect of the invention is a two-part polyester resin system. The two-part polyester resin composition includes: a hardener composition including a reactive carrier comprising an epoxy resin and a peroxide catalyst; and a resin composition including a reactive polymer, a reactive monomer, or combinations thereof.

Another aspect of the invention is a method of making a polyester resin composition. The method includes: providing a hardener composition including: a reactive carrier comprising an epoxy resin and a peroxide catalyst; providing a resin composition including: a reactive polymer, a reactive monomer, or combinations thereof, wherein a ratio of a volume of the hardener composition to a volume of the resin composition is about 1:10 to about 1:1; and mixing the hardener composition and the resin composition in the volume ratio of about 1:10 to about 1:1 to form the polyester resin composition.

DETAILED DESCRIPTION OF THE INVENTION

The present invention involves a polyester primer, resin, filler, adhesive, or putty that can be applied to metal substrates, such as cold rolled steel, galvanized steel, and aluminum, as well as to plastic substrates, such as polyesters, polyurethanes, polyolefins, sheet molding compounds (SMC), and bulk molding compounds (BMC).

The goal was to identify a carrier for the catalyst which will not react with the catalyst, which can be stabilized in the presence of peroxides, and which will be a reactive component in the system by crosslinking with the unsaturated polyester effectively, maintaining an integral cure. At a minimum, the carrier should not impede the cure of the unsaturated polyester. The material should be of a reasonable viscosity so as to be practical for dispensing and mixing. In addition, it should be stable in the presence of peroxides for long periods, such as more than six months, or more than one year, or longer.

The present invention involves the use of a reactive carrier, rather than a non-reactive carrier, such as phthalate plasticizers. The use of a reactive carrier greatly increases the challenge of stabilization of the blend. It will be a reactive component in the system, but it can be stabilized in the presence of the catalyst alone. Preferably, the reactive carrier is a epoxy resin. When combined with the resins that are sufficiently thinned with reactive diluent, it can provide an integral cure with a catalyst dispersion level up to about 100 parts per hundred resin or filler by weight.

The ability to measure the mix ratio of catalyst to resin accurately will reduce or eliminate the most common problems associated with unsaturated polyester repair product use, and will increase the value of the product to the user.

The invention involves the use of peroxide catalysts dispersed in a reactive carrier, such as an epoxy resin, to be used as the hardener side for a two-part resin system. Suitable epoxy resins include, but are not limited to, diglycidal ether bisphenol A, diglycidal ether bisphenol F, and epoxylated Novolac resins, or combinations thereof.

This invention may be used in combination with the invention described in U.S. application Ser. No. 11/178,652 (U.S. Publication No. 2007/0010608), which is incorporated herein by reference, where a non-diluted unsaturated polyester resin is specified as a suitable reactive carrier. As described there, the unsaturated polyester should have a sufficiently low molecular weight that the viscosity is practical in the absence of a reactive diluent. Generally, the viscosity is less than about 10,000 cps. Most unsaturated polyesters are solids at room temperature in a non-diluted state.

However, unsaturated polyesters designed for pigment dispersion have very low molecular weight. Examples include, but are not limited to, non-diluted, low viscosity maleate-based or fumarate-based unsaturated polyesters. The epoxy resin and the non-diluted unsaturated polyester resin may be combined in any ratio to be used as the reactive carrier for the peroxide.

Suitable peroxide catalysts include, but are not limited to, ketone peroxides, cumyl hydroperoxides, dibenzoyl peroxides, peroxyesters, peroxyketals, and peroxydicarbonates. Suitable ketone peroxides include, but are not limited to, methyl ethyl ketone peroxide, 2,4-pentadione peroxide, methyl isobutyl ketone peroxide, acetyl acetone peroxide, cyclohexanone peroxide, or combinations thereof.

The hardener side can also include fillers such as talcs, carbonates, pigments, rheological modifiers, microspheres, pigment wetting and dispersing agents, paraffins, and fiber reinforcements, or combinations thereof.

The resin side of the system can include a reactive polymer, or a monomer, or a combination of the two. Suitable reactive polymers include, but are not limited to, unsaturated polyesters, vinyl esters, and hybrid epoxy-polyester and acrylate-polyester systems that polymerize by way of a free radical mechanism, or combinations thereof. Suitable monomers include, but are not limited to, styrene, vinyl toluene, other methyl styrene monomers, methyl methacrylate, and other acrylate monomers, or combinations thereof.

The resin side can also include fillers such as talcs, carbonates, pigments, rheological modifiers, silica, microspheres, pigment wetting and dispersing agents, paraffins, and fiber reinforcements, or combinations thereof.

The fillers can be included in the hardener side and the resin side so that the volume of the two compositions are approximately the same. The ratio of the volume of the hardener side to the volume of the resin side is generally about 1:10 to about 1:1, typically about 1:10 to about 1:2. With the volume ratio in this range, it is much easier to provide the correct amount of hardener for the amount of resin used, eliminating the guesswork of prior art systems.

Controlling the volume of each side will allow the use of a variety of mixing tube applicators. One example of a mixing tube applicator is a double barrel mixing tube which has the hardener composition on one side and the resin composition on the other side. The plunger dispenses the hardener composition and resin composition in the proper amounts so that they can be mixed and applied.

Another suitable mixing tube applicator is a "universal cartridge." The universal cartridge incorporates both sides of the product in a single barrel. It uses front and back chambers with a transfer tube from the back to deliver both sides in the correct ratio. The benefit of a universal cartridge is the ability to use it with any caulk gun, instead of specific side by side guns. Suitable universal cartridge delivery systems are described in U.S. Pat. Nos. 5,310,091 and 6,938,797.

In order that the invention may be more readily understood, reference is made to the following examples which are intended to illustrate the invention, but not limit the scope thereof.

EXAMPLE 1

The hardener (peroxide dispersion) side of the system was prepared using different reactive carriers: 1—short chain dipropylene glycol (DPG) maleate that is non-diluted with monomer; 2—dipentaerythritol pentacrylate monomer; and 3—diglycidyl ether bisphenol A.

Two methyl ethyl ketone peroxide solutions with 9% active oxygen (1 and 2) were used, as well as a 50% benzoyl peroxide paste (3).

An antioxidant, 2,6-di-tertiary-butyl-n,n-dimethylamino-para-cresol (1), was also tested.

| Raw Material | A | B | C | D | E | F |
|---|---|---|---|---|---|---|
| Reactive Carrier 1 | 85.7 | 79.0 | | | 62.8 | 62.7 |
| Reactive Carrier 2 | | | 53.2 | 53.2 | | |
| Reactive Carrier 3 | | | 18.8 | 18.8 | 14.8 | 14.8 |
| Peroxide 1 | 14.3 | 21.0 | | | 22.4 | 22.4 |
| Peroxide 2 | | | | 28.0 | | |
| Peroxide 3 | | | 28.0 | | | |
| Antioxidant 1 | | | | | | 0.02 |
| Total | 100 | 100 | 100 | 100 | 100 | 100 |
| Shelf Stability | >1200 days | >1200 days | 7 days | 20 days | >1200 days | >1200 days |

Samples maintained at ambient temperature.

All values representative of percentage by weight.

The use of an acrylate monomer (Formulations C and D) broke down the stability of the mixture with both benzoyl peroxide and methyl ethyl ketone peroxides.

EXAMPLE 2

The gel time of several samples was measured at high temperature (i.e., 110° C., and 105° C.) over 40 days.

A hardener composition containing bisphenol A epoxy resin was tested with three resin compositions as shown below.

| | 1 | 2 | 3 |
|---|---|---|---|
| Resin Composition | | | |
| Unsaturated Polyester Resin | 0.545181 | 0.440443 | 0.582093 |
| Wetting agent | | 0.005862 | 0.00484 |
| Rheological modifier | 0.004807 | | 0.012099 |
| Adhesion promoter | 0.019827 | 0.010966 | 0.013309 |
| TiO$_2$ | 0.048065 | 0.009969 | 0.024198 |
| Talc | 0.298005 | 0.466364 | 0.317483 |
| Microspheres | 0.084114 | 0.066396 | 0.045977 |
| | 1 | 1 | 1 |
| Hardener Raw Material | | | |
| Epoxy Resin | 0.4878 | | |
| Benzoyl Peroxide Paste | 0.4065 | | |
| Fumed Silca | 0.0407 | | |
| Microspheres | 0.0650 | | |
| | 1.0000 | | |

All values representative of percentage by weight.

The results, which appear in Table 1, showed that the peroxide was stabilized in epoxy resin in the presence of fillers such as microspheres.

TABLE 1

| Day | 1/1 110 F. | 1/2 110 F. | 1/3 105 F. | 1/4 105 F. | 1/5 105 F. | 1/6 105 F. | 1/7 105 F. | 2/1 105 F. | 2/2 105 F. | 2/3 105 F. | 2/4 105 F. | 2/5 105 F. | 3/1 105 F. | 3/2 105 F. | 3/3 105 F. |
|---|---|---|---|---|---|---|---|---|---|---|---|---|---|---|---|
| 1 | 2.75 | 2.88 | 2.73 | 2.82 | 2.78 | 2.67 | 2.78 | 2.95 | 2.25 | 2.87 | 2.95 | 2.67 | 3.5 | 3.17 | 3.35 |
| 2 | | | | | | | | | | | | | | | |
| 3 | | | 2.48 | | | | | 2.42 | | | | | | | |
| 4 | 3.28 | 3.55 | | | | | | | | | | | | 3.02 | |
| 5 | | | | 2.67 | | | | | 2.48 | | | | | | |
| 6 | 3.05 | 2.98 | | | | | | | | | | | | | |
| 7 | | | | | | | | | | | | | | | |
| 8 | 3.25 | | | | 2.6 | | | | | 2.53 | | | | | |
| 9 | | | | | | | | | | | | | | | |
| 10 | | | | | | 3.13 | | | | | 3.47 | | | | |
| 11 | | 3.62 | | | | | | | | | | | | | |
| 12 | | | | | | | | | | | | | | | |
| 13 | 3.27 | | | | | | | | | | | | | 2.78 | |
| 14 | | | | | | | | | | | | | | | |
| 15 | | 3.12 | 2.83 | | | | | 2.45 | | | | | | | 3.32 |
| 16 | | | | | | | | | | | | | | | |
| 17 | | | | | | | | | | | | | | | |
| 18 | | | | | | | | | | | | | | | 3.55 |
| 19 | 2.93 | | | | | | | | | | | | | | |
| 20 | | | | | | | | | | | | | | | |
| 21 | | | | | | | | | | | | | | | |
| 22 | | | | 3.68 | | | | | 3.5 | | | | 3.13 | | |
| 23 | | | | | | | | | | | | | | | |
| 24 | | | | | 3.63 | | | | | | 3.72 | | | | |
| 25 | | | | | | | | | | | | | | | |
| 26 | | | | | | 4.97 | | | | | | 3.92 | 4.27 | | |
| 27 | | | | | | | | | | | | | | 4.5 | |
| 28 | | | | | | | | | | | | | | | |
| 29 | | | | | | | | | | | | | | | |
| 30 | | | | | | | | 2.45 | | | | | | | |
| 31 | | | | | | 5.42 | | | | | | 4.37 | | | |
| 32 | | | | | | | | | | | | | | | 4.83 |
| 33 | | | | | 3.62 | | | | | 3.88 | | | | | |
| 34 | | | | | | | | | | | | | | | |
| 35 | | | | | | | | | | | | | | | |
| 36 | | | | | | | | | | | | | | 5.67 | |
| 37 | | | | | | 5.5 | | | | | | | | | |
| 38 | | | | | | | | | | | | | | | |
| 39 | | | | | | | | | | | | | | | |
| 40 | | | | | | | | | | | | | | | |
| 41 | | | | | | | | | | | | | | | |
| 42 | | | | | | | | | | | | | | | |
| 43 | | | | | 5.52 | | | | | | | 5.13 | | | |

EXAMPLE 3

A sample of the hardener of Example 2 was evaluated using the Self Accelerated Decomposition Test (SADT) performed according to Test H1.1 of the United Nations Orange Book. The sample had a SADT greater than or equal to 55° C.

EXAMPLE 4

Typical sample formulations for different mix ratios are shown.

| | 1:10 | 1:4 | 1:2 | 1:1 |
|---|---|---|---|---|
| Resin Composition | | | | |
| Styrenated Unsaturated Polyester Resin | 43.74 | 35.23 | 28.28 | 24.33 |
| Monomer | 8.75 | 12.92 | 16.06 | 17.92 |
| Wax | 0.07 | 0.07 | 0.07 | 0.07 |
| Tetrahydrophthalic acid | 1.94 | 1.88 | 1.81 | 1.77 |
| $TiO_2$ | 2.43 | 2.35 | 2.26 | 2.21 |
| Rheological Modifier | 0.49 | 0.47 | 0.45 | 0.44 |
| Microtalc | 13.37 | 12.92 | 12.44 | 12.16 |
| Calcium Carbonate | 12.15 | 11.75 | 11.34 | 11.06 |
| Microspheres | 8.51 | 5.87 | 4.52 | 1.66 |
| Hardener Composition | | | | |
| Reactive Carrier | 4.86 | 11.74 | 16.97 | 19.91 |
| Microspheres | 1.22 | 2.35 | 3.39 | 6.08 |
| Benzoyl Peroxide (50%) | 2.43 | 2.35 | 2.26 | 2.21 |
| Total | 100.00 | 100.00 | 100.00 | 100.00 |

All values are representative of percent by weight

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A hardener composition useful in a two part resin system consisting essentially of:
   a reactive carrier comprising an epoxy resin;
   a peroxide catalyst; and
   optionally, at least one filler.

2. The hardener composition of claim 1 wherein the hardener composition has a shelf life of over six months.

3. The hardener composition of claim 1 wherein the epoxy resin comprises diglycidal ether bisphenol A, diglycidal ether bisphenol F, epoxylated novalac resins, or combinations thereof.

4. The hardener composition of claim 1, wherein the peroxide catalyst is selected from ketone peroxides, cumyl hydroperoxides, dibenzoyl peroxides, peroxyesters, peroxyketals, peroxydicarbonates, or combinations thereof.

5. The hardener composition of claim 4, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide, or combinations thereof.

6. The hardener composition of claim 1, wherein the filler is selected from talcs, carbonates, pigments, rheological modifiers, silica, microspheres, pigment wetting and dispersing agents, paraffins, fiber reinforcements, or combinations thereof.

7. The hardener composition of claim 1 wherein the reactive carrier further comprises a non-diluted unsaturated polyester.

8. The hardener composition of claim 7 wherein the non-diluted unsaturated polyester comprises a short chain unsaturated aliphatic dicarboxylic acid based polyester.

9. The hardener composition of claim 8, wherein the short chain unsaturated aliphatic dicarboxylic acid based polyester comprises a maleate based polyester or a fumarate based polyester.

10. A two-part polyester resin system comprising:
    a hardener composition consisting essentially of:
       a reactive carrier comprising a epoxy resin;
       a peroxide catalyst; and
       optionally, at least one filler; and
    a resin composition comprising:
       a reactive polymer, a reactive monomer, or combinations thereof.

11. The two-part polyester resin system of claim 10 wherein the hardener composition has a shelf life of over six months.

12. The two-part polyester resin system of claim 10, wherein the epoxy resin comprises diglycidal ether bisphenol A, diglycidal ether Bisphenol F, epoxylated Novalac resins, or combinations thereof.

13. The two-part polyester resin system of claim 10, wherein the peroxide catalyst is selected from ketone peroxides, cumyl hydroperoxides, dibenzoyl peroxides, peroxyesters, peroxyketals, peroxydicarbonates, or combinations thereof.

14. The two-part polyester resin system of claim 10, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide, or combinations thereof.

15. The two-part polyester resin system of claim 10, wherein the resin composition further comprises at least one filler.

16. The two-part polyester resin system of claim 15, wherein the filler is selected from talcs, carbonates, pigments, rheological modifiers, silica, microspheres, pigment wetting and dispersing agents, paraffins, fiber reinforcements, or combinations thereof.

17. The two-part polyester resin system of claim 10, wherein the filler is selected from talcs, carbonates, pigments, rheological modifiers, silica, microspheres, pigment wetting and dispersing agents, paraffins, fiber reinforcements, or combinations thereof.

18. The two-part polyester resin system of claim 10, wherein the resin composition comprises the reactive polymer selected from unsaturated polyesters, vinyl esters, hybrid epoxy-polyester systems, hybrid acrylate-polyester systems, or combinations thereof.

19. The two-part polyester resin system of claim 10, wherein the resin composition comprises the reactive monomer selected from styrene, vinyl toluene, methyl styrene monomers, methyl methacrylate, acrylate monomers, or combinations thereof.

20. The two-part polyester resin system of claim 10 wherein the reactive carrier further comprises a non-diluted unsaturated polyester.

21. The two-part polyester resin system of claim 10, wherein a ratio of a volume of the hardener composition to a volume of the resin composition is in a range of about 1:10 to about 1:1.

22. A method of making a polyester resin composition comprising:
    providing a hardener composition consisting essentially of:
       a reactive carrier comprising an epoxy resin;
       a peroxide catalyst; and
       optionally, at least one filler;
    providing a resin composition comprising:
       a reactive polymer, a reactive monomer, or combinations thereof;
    wherein a ratio of a volume of the hardener composition to a volume of the resin composition is about 1:10 to about 1:1; and
    mixing the hardener composition and the resin composition in the volume ratio of about 1:10 to about 1:1 to form the polyester resin composition.

* * * * *